US006400816B1

(12) United States Patent
Hjalmtysson et al.

(10) Patent No.: US 6,400,816 B1
(45) Date of Patent: Jun. 4, 2002

(54) NETWORK-INDEPENDENT COMMUNICATIONS SYSTEM

(75) Inventors: Gisli Hjalmtysson, Gillette; Ajay Jain, Holmdel, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/848,457

(22) Filed: May 8, 1997

(51) Int. Cl.$^7$ ................................................. H04M 3/42
(52) U.S. Cl. ........................... 379/201.03; 379/201.01; 379/201.02; 379/201.05; 379/211.01; 379/211.02; 379/211.03
(58) Field of Search ......................... 273/439; 379/157, 379/207, 211, 233, 88.1, 67.1, 201, 206, 355, 399, 201.02, 201.03, 201.05

(56) References Cited

U.S. PATENT DOCUMENTS

| | | | | |
|---|---|---|---|---|
| 5,206,901 A | * | 4/1993 | Harlow et al. ............... | 379/211 |
| 5,222,125 A | * | 6/1993 | Creswell et al. ........... | 379/67.1 |
| 5,329,578 A | * | 7/1994 | Brennan et al. ............. | 379/67 |
| 5,369,694 A | * | 11/1994 | Bales et al. ................. | 379/206 |
| 5,543,789 A | | 8/1996 | Behr et al. .................. | 340/995 |
| 5,600,643 A | * | 2/1997 | Robrock, II ................. | 370/399 |
| 5,655,015 A | * | 8/1997 | Walsh et al. ........... | 379/201.04 |
| 5,754,636 A | * | 5/1998 | Bayless et al. .......... | 379/142.1 |
| 5,790,638 A | * | 8/1998 | Bertacchi .................... | 379/207 |
| 5,862,209 A | * | 1/1999 | Kapsales .................... | 379/214 |
| 6,046,762 A | * | 4/2000 | Sonesh et al. ........... | 348/14.11 |
| 6,144,670 A | * | 11/2000 | Sponaugle .................. | 370/401 |

FOREIGN PATENT DOCUMENTS

| | | | |
|---|---|---|---|
| WO | WO 92/11603 | 7/1992 | .......... G06F/15/62 |
| WO | WO 97/06625 | 2/1997 | .......... H04M/3/42 |
| WO | WO 97/07625 | 2/1997 | .......... H04M/11/00 |

OTHER PUBLICATIONS

Canadian Office Action, Mar. 17, 2000, referencing U. S. Patent 5,543,789.
AT&T Technical Journal, vol. 64, No. 6, part 2, pp. 1305–1564, Jul./Aug. 1985.*
SIGCOMM '88 Symposium, Communication Architectures & Protocols, Standford, California, Aug. 16–19, 1988, Congestion Avoidance and Control, by Van Jacobson.*

* cited by examiner

Primary Examiner—Ahmad Matar
Assistant Examiner—Bing Bui
(74) Attorney, Agent, or Firm—Kenyon & Kenyon

(57) ABSTRACT

A communications system is designed to receive programmed instructions from an end-user device, invoke within the system the necessary processes needed to execute these instructions, and to marshal and allocate the needed resources to deliver a communications service requested by the sender of the programmed instructions

19 Claims, 5 Drawing Sheets

NETWORK-INDEPENDENT COMMUNICATIONS SYSTEM

TECHNICAL FIELD

This disclosure relates to communications systems, and more particularly to a method and a system for delivering customized communications services to users.

BACKGROUND

Few industries have experienced as rapid and drastic changes as the communications industry in the last fifteen years. Those changes partially caused by the increased deregulation of the communications industry have resulted in two separate legacy networking infrastructures for voice and data communications services delivery. The networking infrastructures, namely the Internet and the traditional communications carriers' network, feature divergent service delivery models and different approaches to service creation.

On one hand, the Internet has fundamentally changed the landscape of traditional communications services by offering a uniform service model that provides a technological platform which facilitates rapid communications service creation. Key factors in the Internet architecture include the separation of responsibility between the network and the end-points, and limited integration of service software into the underlying network. In essence, the network is responsible for delivering packets without caring for their "meaning" while the end hosts are responsible for applying service semantics to give "meaning" to the packets received. In other words, a network of limited intelligence provides basic communications services to sophisticated and intelligent end-points. For example, in Java applications, the Internet delivers to a server packets transmitted thereto by a client which receives in return from the server (via the Internet) a particular set of instructions for execution by the client. Thus, communications services delivered via the Internet can be created by storing the appropriate software on the server and services request parameters on the client without introducing any changes in the configuration or capacity of network nodes. Another advantage of the Internet architecture is that services are associated with users independently of their location or point of access to the network. Unfortunately, the loose coupling of networking nodes and limited integration of service software in the Internet architecture result in poor service quality in general, and unpredictable response time in particular.

In contrast, the traditional telecommunications infrastructure is a tightly knit web of hardware and software, where service logic is interwoven with the network fabric at all levels thereof. For example, freephone service, commonly known as "800 service" involves network-based service logic at different levels. To wit, the network performs functions that include address or name resolution, load balancing, time-of-day sensitive routing, and reverse charging, to name a few. From a general perspective, inbound communications services are provided to users by executing network-based software programs that sometimes use as input subscriber data previously stored in the service provider network. On the other hand, outbound communications services are provided based on the features associated with the caller's ANI, as opposed to the caller's identity. While service integration promotes network performance, it unfortunately introduces undesirable side effects. For example, subscribers of communications services deplore the fact that they are treated as "phone jacks" as opposed to customers with real needs for features that are independent of their point of access to, or egress from, the network. Furthermore, introduction of new services in traditional networks is unduly complex, prone to delays, and costly because provisioning for the new services typically impacts one or more existing services. While the tight integration of hardware and software is understandably motivated by the high networking standards of quality and performance, there is a growing need for cost effective architecture for service and network management comparable in flexibility to the Internet, yet capable of maintaining the high service quality of the traditional telecommunications infrastructure for increasingly complex communications services.

Another problem of the prior art is the inability of subscribers to request from their service providers communications services tailored to their particular needs. For example, users cannot define service features on demand, nor customize service features per user per call dynamically. Hence, there is an unfulfilled need for communications services users to create their own communications services for delivery by communications services providers.

SUMMARY

The present disclosure is directed to a communications system that is designed to receive programmed instructions from an end-user device, invoke within the network the necessary processes that are needed to execute these instructions, and to marshal and allocate the needed resources to deliver a communications service requested by the sender of the programmed instructions. Needed resources may be mustered from within or outside of the network to implement call-by-call provisioning for delivery of a communications service transparently across domains of network ownership and across heterogeneous communication technology (wireless, Internet, broadband, narrowband). Hence, network provisioning and management functions are de-coupled from service management and delivery functions. In addition, the requested communications service may be dynamically created by the execution of the programmed instructions. As used herein the expression "programmed instructions" refers to service-specific data and the logic to interpret such data.

In an embodiment of the principles disclosed herein, a user may design a software program that allows a set of telephone numbers to be dialed in a particular sequence for communications with one or more persons associated with those telephone numbers. The programming instructions of the software program are stored in the memory of an end-user device. When a user of the device uploads into the network the programming instructions of the software program to request the communications service associated therewith, a processor in the network executes those instructions to dial those numbers in the sequence indicated in the software program. Upon detecting a ring-no-answer or a busy-line condition for a dialed telephone number, the processor returns a signal indicative of the encountered condition to the programmed instructions which then instruct the processor to proceed to dial the next number in the sequence. When one of the calls is answered by a called party, the network establishes a communications path between the user (or user application) of the device and the called party. Optionally, the programmed instructions may direct the network to deliver an electronic-mail message indicative of the time, the date and the different telephone numbers dialed by the network to deliver the requested communications service.

In another example of the principles disclosed herein, an end-user device may upload to a communications system programming instructions to request that an audio or video call be routed over a particular communications carrier network that is selected by the communications system based on instructions-indicated parameters that may include, for example, tariff rates, sound and/video quality, network congestion level, to name a few.

In yet another example of the principles disclosed herein, a user may upload programming instructions to a switched video communications system to request therefrom a multimedia file or a movie that is selected based on parameters defined in the programming instructions. These parameters may include, for example, characteristics associated with the content of the multimedia file, such as the language in the audio component of the file, particular images in the multimedia file.

DETAILED DESCRIPTION

Figure 1:
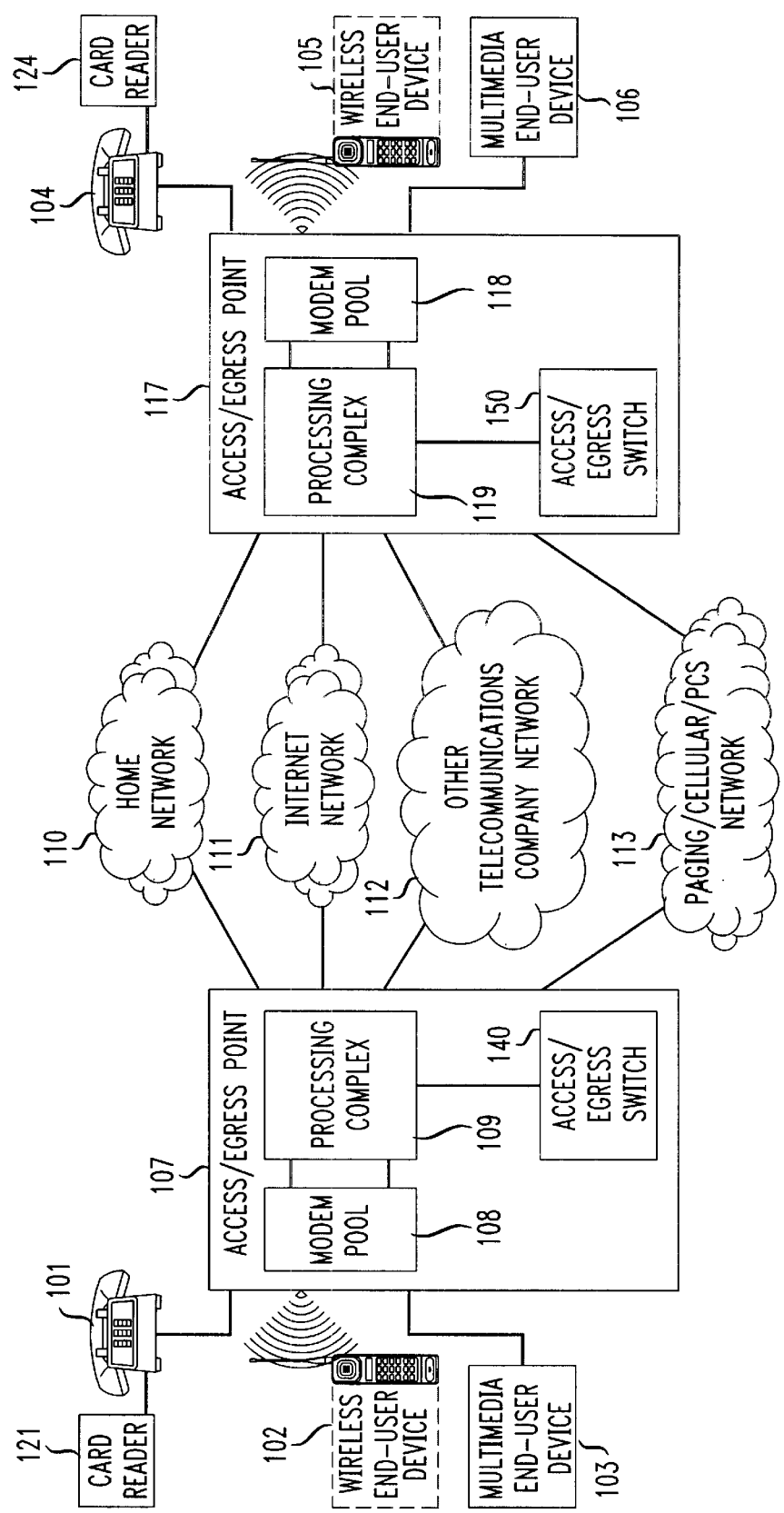
FIG. 1 is an illustrative representation of a communications system arranged in accordance with the principles disclosed herein to deliver a communications service requested by a sender of programmed instructions to the communications system.

FIG. 1 is an illustrative representation of a communications system arranged in accordance with the principles disclosed herein to deliver a communications service requested by a user who transmitted programmed instructions to the communications system. The drawing of FIG. 1 shows end-user devices 101 to 106, access/egress points 107 and 117 and communications networks 110 to 112. End user devices 101 and 104 are well known analog telephone sets to which are connected card reader/writers 121 and 124, respectively. Card reader/writer 121 (124) includes an analog interface chip (not shown) that is arranged to receive data from, and/or transmit data to a smart card via the mating of the capacitive plates of the smartcard to the capacitive plates of card reader/writer 121 (124). Card reader/writer 121 (124) also includes a modem that converts analog signals received therein into digital signals transmitted to a smart card. Conversely, the modem of card reader/writer 121 (124) converts digital signals received from a smart card to analog signals for transmission to access/egress points 107. When no smartcard is engaged in card reader/writer 121 (124), analog signals pass through card reader/writer 121 (124) unaltered, thereby allowing analog telephone set 101 (104) to receive supervisory and speech signals without interference from card reader/writer 121 (124).

Also shown on FIG. 1 are wireless end-user devices 102 and 105 and multimedia end-user devices 103 and 106. Wireless end-user devices 102 and 105 may be AT&T PocketNet™ phone which is arranged to transmit and receive packetized information using the Internet Protocol (IP) and the Cellular Digital Packet Data (CDPD) standard. Multimedia end-user devices 103 and 106 may be implemented as minicomputers or personal computers on which operates multimedia software that allows multimedia end-user devices 103 and 106 to receive and transmit voice data and video signals.

Figure 2:
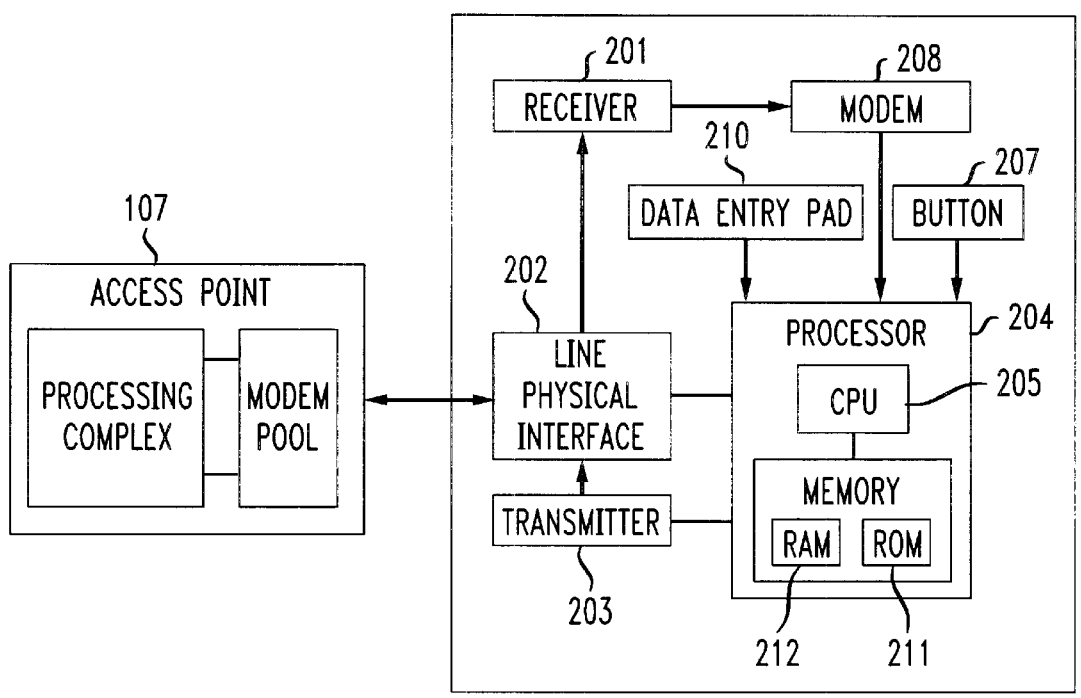
FIG. 2 shows the major components of an illustrative end-user device that may be used to upload programming instructions to the communications system of FIG. 1.

All the end-user devices of FIG. 1 must possess certain attributes to implement the principles disclosed herein. FIG. 2 presents a composite view of those attributes as implemented in the components shown therein.

All the end-user devices of FIG. 1 receive and/or transmit information to access/egress points 107 and/or access/egress point 117 which serve as the liaison e.g., logical and physical interfaces between end-user devices 101 to 106 and networks 110, 111 and 112. Access/egress point (107) 117 includes a modem pool 108 whose individual modems convert analog (digital) signals received from card reader/writer 121 (124) to digital (analog) signals, as needed. Of particular significance among the components of access/egress point 107 (117) is processing complex 109 (119) whose features and functionality are described in detail below. It is worth noting that although processing complex 109 (119) is shown as a component of access/egress point 107 (117), other implementations of the principles disclosed herein may consider placing processing complex 109 (119) at some inner nodes of networks 110, 11, 112 or 113.

FIG. 2 shows the major components of an end-user device needed to implement the principles disclosed herein. The end-user device of FIG. 2 may be implemented as a smart card for use with a telephone set such as telephone set 101 (111) with card reader/writer 121 (124). Alternatively, the end-user device of FIG. 2 may be implemented as a standalone digital or analog wireless end-user device such as a portable processor equipped with a Personal Computer Memory Card International Association (PCMCIA) card for analog air interfaces. Because the end-user device may be used for different implementations, certain components shown in the drawing of FIG. 2 may not be needed for a particular implementation. For example, when the end-user device of FIG. 2 is implemented as a smart card, modem 208 and data entry pad 210 may not be needed.

The end-user device of FIG. 2 includes a receiver 201, a line physical interface 202, a transmitter 203, a button 207, a modem 208, and a processor 204. The latter is comprised of a memory 206 and CPU 205. Memory 206 may be implemented as an Electrically Erasable Programmable Read-Only-Memory (EEPROM) which is a non-volatile memory arranged to store information such as processing instructions and other appropriate data to be uploaded to access/egress point 107 (117) of FIG. 1. Information stored in memory 206 may be input thereto via data entry pad 210. Alternatively, processing instructions and/or data may be downloaded to memory 206 via line physical interface 202 and other appropriate components (such as receiver 201 and modem 208) if needed. Conversely, processing instructions are uploaded to access/egress point 107 (117) of FIG. 1 via transmitter 203 and line physical interface 202. At the heart of the communications device of FIG. 2 is processor 204 which uses CPU 205 to execute programming instructions to fetch data and instructions stored in memory 206 for uploading the fetched data and instructions to access/egress point 107 (117) of FIG. 1. The operations of processor 204 may be triggered when a user depresses button 207. Alternatively, the operations of processor 204 may be initiated when a user swipes a smart card embodying most of the components of FIG. 2 into card reader 121 (124) of telephone set 101 (104). When line physical interface 202 is an analog component, modem 208 is activated to convert the digital signals associated with the fetched data and instructions into analog signals that are then uploaded to access/egress point 107 (117) of FIG. 1 via transmitter 203.

Referring back to FIG. 1, all the end-user devices of FIG. 1 receive and/or transmit information to access/egress points 107 and/or access/egress point 117 which serve as the liaison e.g., logical and physical interfaces between end-user devices 101 to 106 and networks 110, 111 and 112. Access/egress point (107) 117 includes a modem pool 108 whose individual modems convert analog (digital ) signals received from card reader/writer 121 (124) to digital (analog) signals, as needed. Access/egress point 107 (117) also includes access/egress switch 140 (150) which may be implemented using for example, the Lucent Technologies #5ESS™ communications switch. A detailed description of the Lucent Technologies #5ESS communications switch is provided in AT&T Technical Journal, Vol. 64, No. 6, part 2, pp. 1305–1564, July/August, 1985. Of particular significance among the components of access/egress point 107 (117) is processing complex 109 (119) which is a general purpose computer that is arranged to a) receive instructions transmitted thereto by end-user devices 101 to 106 b) execute those instructions to ascertain the type of communications service(s) associated with those instructions and c) request and marshal appropriate resources from network 111, 112 or 113, if needed, to deliver the requested communications service to the end-user, as described in detail below.

Home network 110 may be the communications network of the service provider selected by the end-user. Home network 110 may be one or more commonly owned or operated communications networks arranged to deliver one or more communications services (POTS service, wireless communications service, Internet access service, paging service, multimedia communication service, Community Antenna TeleVision (CATV) service, to name a few. Internet network 111 may be implemented as a wide area network that allows a group of interconnected processors to exchange data according to a common protocol, such as the Internet Protocol (IP). Other Telecommunications Company network 112 may be a conglomerate of voice and/or data and/or multimedia networks under common ownership or management. Paging/cellular/PCS network 113. It is worth noting that although FIG. 1 shows only Internet network 111, other telecommunications company network 112 and paging/cellular/PCS network 113, different other types of networks could be included as well.

Figure 3:
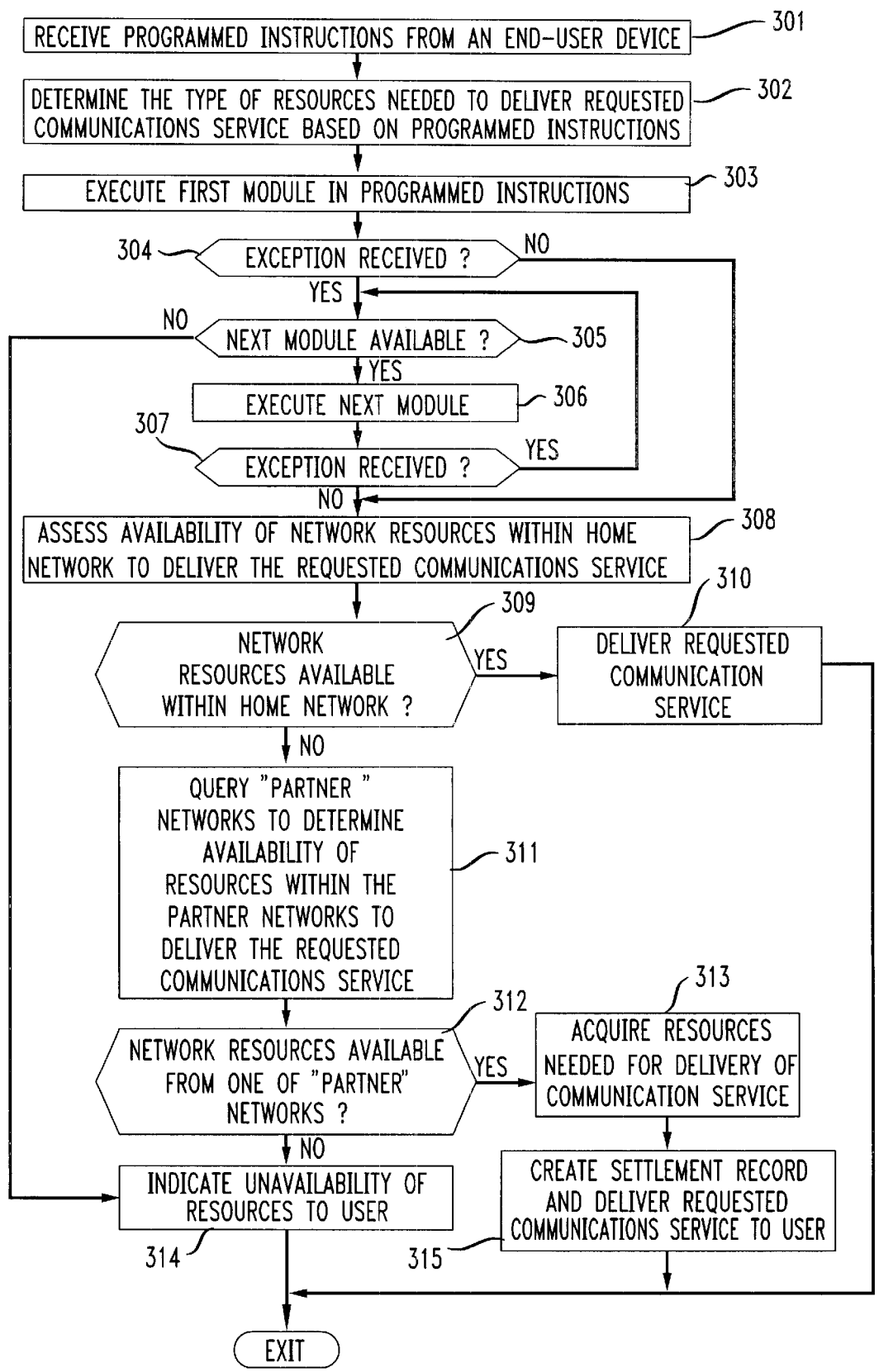
FIGS. 3, 4 and 5 present in flow diagram format actions taken and decisions formulated by different components of FIG. 1 to implement the principles disclosed herein.

The functions performed by processing complex 109 (119) are illustrated in FIG. 3. It is worth noting that most, if not all of the functions performed by processing complex 109 (119) are discharged as a result of the execution of programmed instructions received from an end-user. The operations of processing complex 109 (119) are triggered in step 301 when it receives programmed instructions from an end-user device, such as wireless end-user device 102. Upon receiving those instructions, processing complex 109 (119) in step 302, executes these instructions to determine the type of resources needed to deliver the communications service requested by a user. By way of example, not of limitation, execution of the instructions may indicate that the user wants to receive a combination of Plain Old Telephone Service (POTS), paging service, electronic mail, multimedia communications service or information retrieval under particular conditions as described in further detail below in connection with FIGS. 4 and 5.

Upon identifying the type of resources needed to deliver the communication service(s) requested by the user through the execution of the received instructions, processing complex 109 (119), in step 303, executes the first service module in the received programmed instructions. Thereafter, processing complex 109 (119) determines in step 304 whether an exception was received as a result of the execution of the first service module. If so, processing complex 109 (119) in step 305 determines whether another service module is available within the received programmed instructions. If so, processing complex 109 (119) executes the next service module in step 306 and determines whether an exception is generated from the execution of the service module, as shown in step 307. An exception condition is any condition, either imposed by the network or by the programmed instructions, that prevents the communications service(s) requested by the sender of the programmed instructions to be delivered. This may be due to calling and/or called parties preferences that are considered for service delivery in specific circumstances or situation, such as time of day, refusal to pay for roaming charges in wireless communications applications, to name a few.

Processing complex 109 (119) repeats steps 305 and 306 as long as exceptions(s) is (are) received or all the service modules in the received instructions have been executed. When one or more exceptions are received from the execution of one or more service modules, as determined in step 304 or 307, and no more service modules are available in the received programmed instructions, as determined in step 305, processing complex 10 (119) potentially through the execution of a special module in the received instructions, in step 314, indicates to end-user (application) the unavailability of the requested communications service(s).

When no exception is received from the execution of a service module, as determined in step 304 or 307, processing complex 109 (119), in step 308 assesses whether network resources needed to deliver the requested communications service(s) are available within home network 110 which supervises the operations of processing complex 109 (119). Home network 110 is the communications network of the service provider selected by the end-user or subscriber. If the identified network resources are available within home network 110, processing complex 109 (119) proceeds in step 310 to deliver or to cause the requested communications service(s) to be delivered. This may be accomplished for example, by processing complex 109 (119) exchanging appropriate signaling messages or control messages with access/egress switch 140 (150) and/or other networking equipment (not shown), as explained below in connection with FIG. 4.

When network resources that are needed to deliver the requested communications service(s) are not available from home network 110, as determined in step 303, processing complex 109 (119), in step 305, queries appropriate "partner" networks, such as Internet network 111, other company telecommunications network 112 and/or paging/cellular/PCS network 113 to ascertain availability of network resources for service delivery. The policy for selecting a "partner" carrier may be part of the uploaded program instructions. The querying function may be performed, for example, by exchanging signaling or control information between processing complex 109 (119) and each of the queried partner networks. For example, processing complex 109 (119) may send a signaling message to other company telecommunications network 112 instructing such network to a) complete one or more calls to one more destinations and b) return a signaling message indicative of the call (s) disposition (ring-no-answer, busy, refused, answered/connected). When the network resources needed to deliver the requested communications service(s) are not available from one or more partner networks, as determined in step 312, processing complex 109 (119) in step 314 through the execution of a special module in the received instructions, indicates to the end-user the unavailability of the requested communications services(s). Alternatively, communications services of a lesser quality than the one requested may be delivered to the end-user when less than the full amount of the resources needed are available if such an alternative is set forth in the received programmed instructions.

When the network resources needed to deliver the requested communications service are available from one or more partner networks, as determined in step 312, processing complex 109 (119) in step 313 acquires the necessary resources for delivery of the requested communications services(s). Thereafter, processing complex 109 (119) through the execution of billing instructions proceeds in step 315, to create a settlement record before delivering the requested communications service(s) to the user. The settlement record is updated at the termination of the communications service.

The principles described in conjunction with FIG. 3 may be used for speech recognition applications. As is well known in the art, a speech recognition system consists of three pieces: a sample encoder, a recognition engine (a sample parser), and a data-base of samples used by the recognition engine for scoring translation hypothesis. Ideally, the sample encoder is close to the speaker. Similarly, the recognition engine is ideally located near the sample base. To improve speech recognition performance, ideally the recognition is performed using a sample base that most closely matches the particular speech pattern characteristics (pronunciation, accent and vocabulary) of the speaker. Unfortunately, one of the problems with speech recognition systems, is the occasional operability of such systems due to speaker-dependent attributes. Specifically, because there is tremendous variability in pronunciation, accents, and vocabulary among English-speaking people a sample base yielding good performance for an English speaker with Scandinavian accent for example, may perform poorly for a speaker with Japanese accent. Similarly, synthetic speech is most readily understood if generated with accent similar to that of the listener.

In a speech recognition application of the principles described in FIG. 3, a user through end-user device 200 would upload to processing complex 109 (119) programmed instructions that would include for example, an indication of the language spoken by the user and a sample base that most closely matches the particular speech pattern characteristics (pronunciation, accent and vocabulary) of the user. Upon receiving those programmed instructions, processing complex 109 (119) uses the language identified in those instructions and the sample base for all communications services requested by the user that requires the use of speech recognition system.

Figure 4:
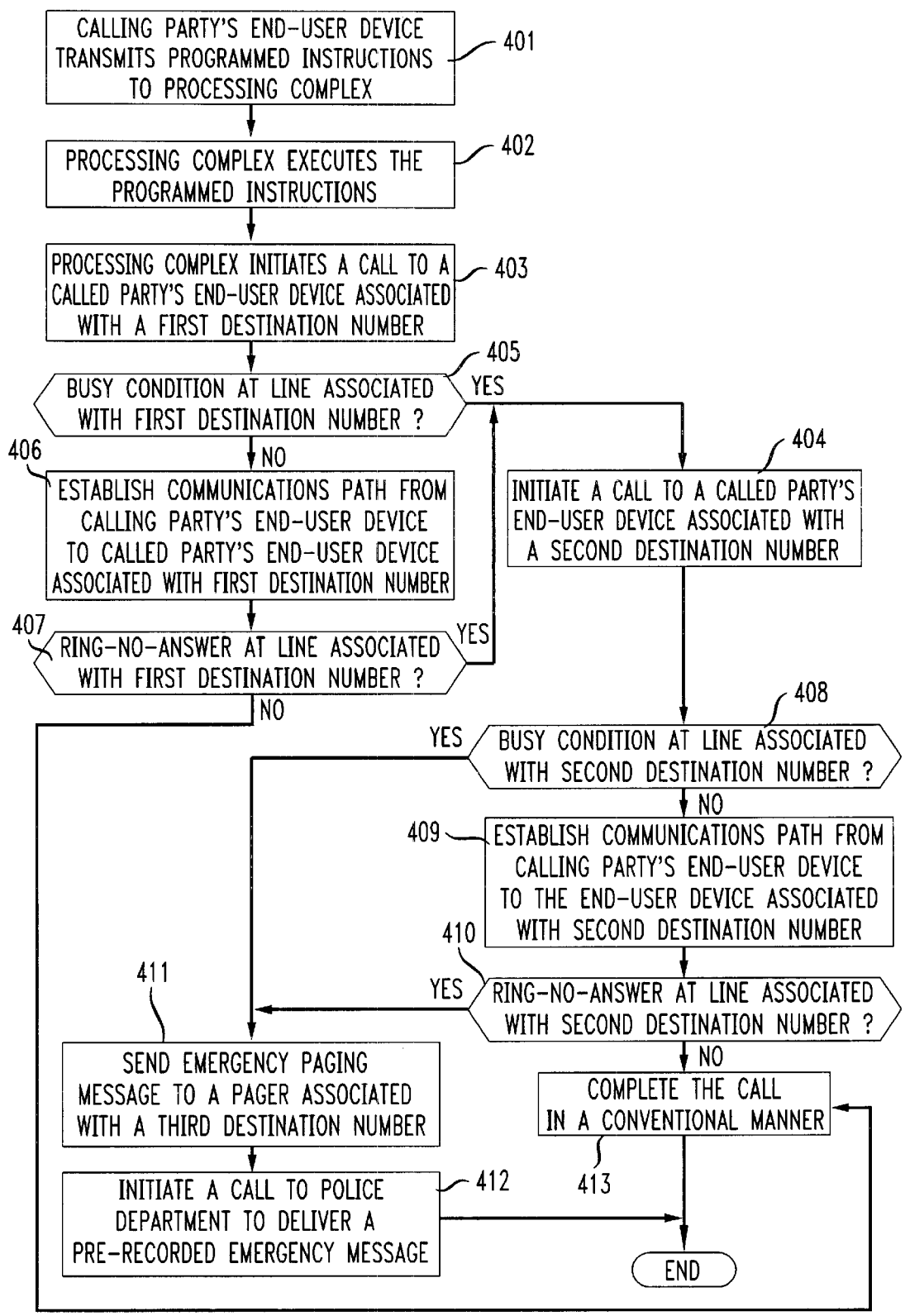

FIG. 4 presents an exemplary implementation of the principles of this disclosure. This implementation is initiated in step 401 when a calling party at an end-user device transmits programmed instructions to processing complex 109 (119). Step 401 may be performed, for example by a user depressing or releasing button 207 and placing device 200 close to the microphone in the handset of telephone set 101 (104). Alternatively, the user may swipe a smart card through card reader 121 (124). The release of button 207 causes telephone set 101 (104) to dial a telephone number associated with one of the modems in modem pool 108. The modem then transmits a short signal to end-user device 200 to indicate that the programmed instructions stored in RAM 212 or ROM 211 can be uploaded to processing complex 109 (119).

Once the programmed instructions are received, processing complex 109 (119) executes those instructions to identify the type resources needed to deliver the communication service(s) requested by the calling party. As specified by the programmed instructions, processing complex 109 (119) in steps 403 places a call to a first destination number identified in the data list accompanying the programmed instructions. The first destination number may be associated with any end-user device, such as wireless end-user device 105 (102), wired telephone set 104 (101) or multimedia end-user device 106 (103) or any other end-user device connected to any of the networks 110 to 112. Step 403 may be performed by processing complex 109 (119) transmitting a signaling message to one of the networks 110 to 112 to inquire about the availability of communications resources to complete the calls to the first destination number indicated in the programmed instructions. When processing complex 109 (119) determines in step 405 that the communications resources are unavailable, e.g. line-busy condition, it automatically initiates a call a second called party at a second destination number per the programmed instructions, as shown in step 404. When processing complex 109 (119) determines in step 405 that the communications resources are available, it establishes in step 406 a communications path from the calling party's end-user device (such as telephone set 101 or 104) to the called party's end-user device associated with the first destination number. If a Ring-No-Answer condition is not encountered at the first destination number, as determined in step 407, the call is completed in a conventional manner, as shown in step 413. Otherwise, processing complex 109 (119) automatically initiates a call to a second called party at a second destination number per the programmed instructions, as shown in step 404. A Ring-No-Answer condition may be deemed to exist after an end-user device has rung a predetermine number of times (four times, for example) without the receiver being taken off-hook.

In the event that a Busy-Line condition is encountered at the line associated with second destination number, as determined in step 408, processing complex 109 (119) in step 411, sends an emergency paging message to a pager at a third destination number. Thereafter, processing complex 109 (119), in step 412 initiates a call to the police department to deliver a pre-recorded emergency message. When the line associated with the second destination number is not busy, as determined in step 408, processing complex 109 (119) establishes a communications path from the calling party's end-user device (such as telephone set 101 or 104) to the end-user device associated with the second destination number. Thereafter, processing complex 109 (119) determines in step 410 whether a ring-no-answer condition is present at the line associated with a second destination number. If no such condition is present at that line, the call is completed in a conventional manner, as shown in step 413.

If both lines are busy or neither called party at first and second destination numbers answer their phone, then processing complex 109 (119), in step 411, sends an emergency paging message to a pager at a third destination number. Thereafter, processing complex 109 (119), in step 412 initiates a call to the police department to deliver a pre-recorded emergency message. The telephone number of the police department is derived by processing complex 109 (119) from location information included in the programmed instructions. This could be as simple as performing a table lookup to associate the exchange number of the Automatic Number Identification (ANI) of the originating number (user number) to the emergency telephone number of the local police. In the particular case of Internet telephony, the programmed instructions may disclose the Internet Protocol address or the host-id of the user device, from which the processing complex may be able to derive the user location.

It is worth noting that more than two destination numbers could be dialed before steps 411 and 412 are performed.

Figure 5:
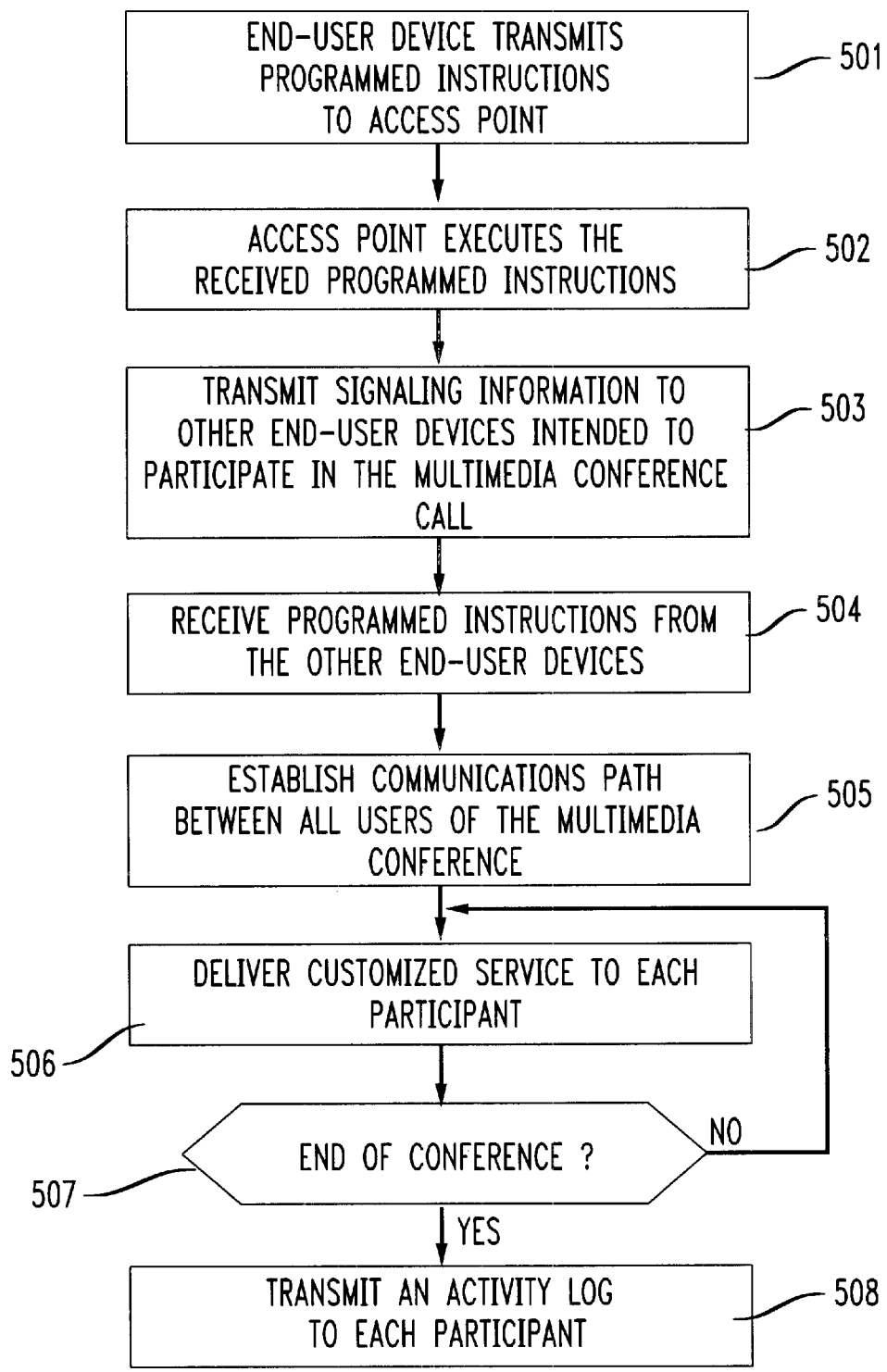

FIG. 5 presents an illustrative multimedia implementation of the principles of this disclosure. This implementation is initiated in step 501 when multimedia end-user device 103 (106) transmits programmed instructions to access point 107 to establish a multimedia conference call over Internet network 111. Such programmed instructions may identify particular services to be provided to one or more participants in the multimedia video conference. These services may include, for example, proprietary encoding, data compression, text-to-speech translation, to name a few. The data accompanying the programmed instructions may also specify for example, the speed of the link between multimedia end-user device 103 (106) and access point 107 (117), or identify a video transmission standard to be used, such as National Television Standards Committee (NTSC) or High Definition Television (HDTV) or the type of video file format to be used, such Joint Photographic Experts Group (JPEG) format or Motion Pictures Experts Group (MPEG) format or Audio Visual Interleaved (AVI) format. In general, the programmed instructions may include an implementation of a proprietary encoding scheme. Upon receiving the programmed instructions transmitted by multimedia end-user device 103 (106), processing complex 109 (119), in step 512, executes those instructions to determine the type of resources needed to deliver the communications service requested by the user. Once processing complex 109 (119) determines that the user wishes to establish a multimedia conference call to participants identified in the processing instructions, processing complex 109 (119), in step 513, sends a signaling or control message to the intended participants inviting them to upload thereto parameters and policies associated with their end-user devices (applications). Upon receiving from the other participants their parameters and policies, in step 504, processing complex 109 (119) then in step 505 establishes or causes to establish the appropriate communications paths between all the participants in the multimedia conference call. Thereafter, processing complex 109 (119 delivers or caused to be delivered the appropriate communications services to each participant. For example, a participant who requires multimedia files to be delivered in AVI format would receive those files in the format requested while other participants that may request ancillary services, such as data compression to allow transmission via low speed lines, or data encoding for security, would also be accommodated. When the multimedia conference call is terminated, as determined in step 507, processing complex 109 (119) in step 508, transmits an activity log of the conference to all participants who requested such service.

The foregoing is to be construed as only being an illustrative embodiment of this disclosure. Persons skilled in the art can easily conceive of alternative arrangements providing functionality similar to this embodiment without any deviation from the fundamental principles of the teachings in this disclosure.

What is claimed is:

1. A method of providing a communications service to a user, comprising the steps of:

receiving in a communications system from an end-user device of a subscriber a set of programmed instructions which include a) software programs and b) corresponding data parameters for use with said programmed instructions; and executing at a processor of said communications system at least one of said software programs using said data parameters in order to direct said communications system to deliver an outgoing communications service based on the execution of the at least one of said software programs, said communications service being delivered substantially immediately after receiving said programmed instructions, said software program identifying a sequence in which a plurality of addresses are to be reached to allow the subscriber to communicate with a receiving party at one of the addresses.

2. The method of claim 1 wherein said communications system is a network comprised of interconnected nodes selected from a group which includes communications switches and routers.

3. The method of claim 1 wherein said communications system is a Private Branch Exchange.

4. The method of claim 1 wherein the communications system is a POTS communications network and wherein the end-user device is a unit capable of encoding and transmitting encoded data in the frequency range of a telephone microphone.

5. The method of claim 1 wherein the programmed instructions are designed to implement protocol conversion.

6. The method of claim 1 wherein the addresses are telephone numbers and wherein the communications system ignores remaining numbers in a sequence once a call is completed to the receiving party.

7. A method of delivering a customized communication service to a user, comprising:

receiving programmed instructions from an end-user device of a subscriber, said programmed instructions including software programs and corresponding data parameters for use with said software programs; and executing said programmed instructions to deliver transparently an outgoing communication service requested by said programmed instructions, said communication service including at least one of a plurality of heterogeneous communications technologies, and said communications service being delivered substantially immediately after receiving said programmed instructions.

8. The method of claim 7 wherein one of said plurality of heterogeneous communications technologies is a POTS communications network, wherein the end-user device is capable of encoding and transmitting encoded data in the frequency range of a telephone microphone.

9. The method of claim 7 wherein one of said plurality of heterogeneous communications technologies is an Internet access service.

10. The method of claim 7 wherein one of said plurality of heterogeneous communications technologies is a paging service.

11. The method of claim 7 wherein one of said plurality of heterogeneous communications technologies is a multimedia communication service.

12. The method of claim 7 wherein one of said plurality of heterogeneous communications technologies is a Community Antenna TeleVision (CATV) service.

13. The method of claim 7 wherein the programmed instructions are designed to implement protocol conversion.

14. The method of claim 7 wherein the programmed instructions identify a sequence in which a plurality of addresses are to be reached to allow the subscriber to communicate with a receiving party at one of the addresses.

15. The method of claim 14 wherein the addresses are telephone numbers and wherein the communications system ignores remaining numbers in a sequence once a call is completed to the receiving party.

16. The method of claim 7 wherein the programmed instructions request the delivery of a multimedia file.

17. The method of claim 7 wherein the programmed instructions request that an telephone call be routed over a particular communications carrier network.

18. The method of claim 7 wherein the programmed instructions request that a video call be routed over a particular communication carrier network.

19. The method of claim 7 wherein the programmed instructions request that an Internet connection to a specific Uniform Resource Locator (URL) be established.

* * * * *